US012628046B2

(12) United States Patent
Rachamadugu et al.

(10) Patent No.: US 12,628,046 B2
(45) Date of Patent: May 12, 2026

(54) PRIORITIZATION OF ISOCHRONOUS STREAMS IN MULTI-PROTOCOL SYSTEM

(71) Applicant: Silicon Laboratories Inc., Austin, TX (US)

(72) Inventors: Jitesh Rachamadugu, Hyderabad (IN); Srinivasa Reddy Konatham, Hyderabad (IN); Ayan Ghosh, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 329 days.

(21) Appl. No.: 18/169,437

(22) Filed: Feb. 15, 2023

(65) Prior Publication Data

US 2024/0276306 A1 Aug. 15, 2024

(51) Int. Cl.
*H04W 28/20* (2009.01)
*H04W 28/06* (2009.01)
*H04W 28/08* (2023.01)

(52) U.S. Cl.
CPC ........... *H04W 28/20* (2013.01); *H04W 28/06* (2013.01); *H04W 28/095* (2020.05)

(58) Field of Classification Search
CPC ............... H04W 28/20; H04W 28/095; H04W 28/06; H04L 1/189; H04L 1/1825
See application file for complete search history.

(56) References Cited

U.S. PATENT DOCUMENTS

| | | | |
|---|---|---|---|
| 6,032,211 | A | 2/2000 | Hewitt |
| 6,148,357 | A | 11/2000 | Gulick |
| 6,973,067 | B1 | 12/2005 | Haartsen |
| 8,605,757 | B2 | 12/2013 | Fourcand |
| 12,483,357 | B2 | 11/2025 | Stationwala et al. |

(Continued)

FOREIGN PATENT DOCUMENTS

| | | |
|---|---|---|
| WO | 2024071871 A1 | 4/2024 |

OTHER PUBLICATIONS

Bluetooth®, "Architecture, Mixing, and Conventions," Specification of the Bluetooth® System, vol. 1, Revision v. 5.3, Revision Date Jul. 13, 2021, 202 pages.
Bluetooth®, "Low Energy Controller," Specification of the Bluetooth® System, vol. 6, Revision v. 5.3, Revision Date Jul. 13, 2021, 422 pages.

(Continued)

*Primary Examiner* — Syed Ali
(74) *Attorney, Agent, or Firm* — Zagorin Cave LLP

(57) ABSTRACT

A multi-protocol wireless communications system uses prioritization of isochronous streams to increase the reliability and improve bandwidth utilization. Placement of subevents in an isochronous interval according to link quality reduces fragmentation of the isochronous interval. A method for multi-protocol communications between wireless communications devices using a wireless communications interface includes placing in an isochronous group event, by a first wireless communications device, at least one subevent for each isochronous stream of a plurality of isochronous streams of an isochronous group based on a historical retransmission rate for each isochronous stream of the plurality of isochronous streams. The method may include counting retransmissions for each isochronous stream of the plurality of isochronous streams to thereby determine the historical retransmission rate for each isochronous stream of the plurality of isochronous streams.

17 Claims, 13 Drawing Sheets

(56) References Cited

U.S. PATENT DOCUMENTS

| | | | |
|---|---|---|---|
| 2009/0201827 A1 | 8/2009 | Kwon | |
| 2010/0054243 A1 | 3/2010 | Stone | |
| 2012/0151537 A1 | 6/2012 | Singh | |
| 2012/0281704 A1 | 11/2012 | Butterworth | |
| 2013/0021933 A1* | 1/2013 | Kovvali | H04W 88/18 |
| | | | 370/252 |
| 2019/0104079 A1* | 4/2019 | Wang | H04L 43/16 |
| 2021/0160009 A1 | 5/2021 | Goyal | |
| 2022/0030505 A1 | 1/2022 | Lee et al. | |
| 2022/0078623 A1 | 3/2022 | Kondareddy | |
| 2022/0200716 A1* | 6/2022 | Bonde | H04H 20/89 |
| 2022/0400503 A1 | 12/2022 | Cavalcanti | |
| 2023/0069016 A1* | 3/2023 | Huang | H04L 1/0045 |
| 2023/0100921 A1* | 3/2023 | Cheong | H04W 76/10 |
| | | | 455/41.3 |
| 2023/0106680 A1* | 4/2023 | Lee | H04W 4/06 |
| | | | 370/329 |
| 2023/0224078 A1 | 7/2023 | Abildgren | |
| 2024/0056207 A1* | 2/2024 | Xu | H04H 20/88 |
| 2024/0121550 A1* | 4/2024 | Kumar | H04R 1/1016 |
| 2024/0155711 A1 | 5/2024 | Chuo | |
| 2024/0179235 A1* | 5/2024 | Kalaimani | H04M 1/6066 |
| 2024/0187137 A1* | 6/2024 | Serikar | H04W 24/02 |
| 2024/0260102 A1 | 8/2024 | Stationwala et al. | |
| 2024/0275525 A1* | 8/2024 | Stationwala | H04L 1/1816 |
| 2024/0276537 A1 | 8/2024 | Rachamadugu et al. | |
| 2024/0334362 A1 | 10/2024 | Stationwala et al. | |
| 2024/0396849 A1 | 11/2024 | Lee | |
| 2025/0048460 A1 | 2/2025 | Lee | |

OTHER PUBLICATIONS

Bluetooth Generic Audio Working Group, "Basic Audio Profile," Bluetooth® Profile Specification, Revision v1.0.1, Revision Date Jun. 21, 2022, 148 pages.

Hunn, N., "Introducing Bluetooth®, LE Audio," published Jan. 2022, downloaded from www.bleaudio.com on Nov. 21, 2022, 315 pages.

Silicon Labs, "UG434: Silicon Labs Bluetooth® C Application Developer's Guide for SDK v3.x and Higher," Revision 1.0, downloaded from silabs.com on Sep. 13, 2022, 35 pages.

Silicon Labs, "UG103.14: Bluetooth® LE Fundamentals," Revision 0.7, downloaded from silabs.com on Sep. 13, 2022, 21 pages.

Townsend, K., "Introduction to Bluetooth Low Energy," downloaded from https://learn.adafruit.com/introduction-to-bluetooth-low-energy, Feb. 14, 2022, 10 pages.

Woolley, M., "The Bluetooth® Low Energy Primer," Version 1.0.4, Jun. 6, 2022, 87 pages.

Woolley, M., "Bluetooth Core Specification Version 5.2 Feature Overview," Version 1.0.1, Dec. 9, 2020, 37 pages.

Bluetooth®, "Bluetooth Core Specification," Version: v5.4, Jan. 31, 2023, by Core Specification Working Group, vol. 1, Part A, §§ 3.4 and 3.5, 20 pages.

Bluetooth®, "Bluetooth Core Specification," Version: v5.4, Jan. 31, 2023, by Core Specification Working Group, vol. 6, Part B, §§ 4.4 and 4.5, 89 pages.

Kanafek, P., "What's New in Bluetooth v5.4: An Overview," Blogs—Nordic Blog—Nordic DevZone, webpage <https://devzone. nordicsemi.com/nordic/nordic-blog/b/blog/posts/whats-new-in-bluetooth-v5-4-an-overview> on Feb. 15, 2023, 7 pages.

* cited by examiner

PRIORITIZATION OF ISOCHRONOUS STREAMS IN MULTI-PROTOCOL SYSTEM

BACKGROUND

Field of the Invention

This disclosure relates to communications systems in general, and more particularly to radio frequency (RF) communications systems.

Description of the Related Art

Bluetooth® Low Energy (BLE) is an exemplary communications protocol designed for low power and low latency applications. In general, BLE specifications support isochronous data transactions (e.g., a Connected Isochronous Stream (CIS) or a Broadcast Isochronous Stream (BIS)) and asynchronous data transactions (e.g., Asynchronous Connection Link (ACL) transactions). Isochronous transactions may be used for latency-sensitive data, i.e., time-bound data for time-synchronized processing (e.g., real time voice or audio streaming) that should be transmitted at a constant rate. The data has a time-limited validity period, at the end of which it is said to expire. Expired data that has not yet been transmitted is discarded. Receiving devices only receive data that is valid with respect to rules regarding its age and acceptable latency. Isochronous data transactions ensure that multiple sink devices, which receive data from the same source, will render the data at the same time. An upper layer of the BLE protocol stack typically uses an isochronous data channel for constant data throughput and periodicity of communication of real time audio data.

In a conventional BLE system, a CIS is associated with a single audio source device and one or more audio sink devices. The source device transmits audio packets to each sink device individually. A sink device acknowledges successful reception of a prior transmission. If the source device does not receive an acknowledgement of receipt of a packet sent in a subevent, then the source device retransmits the packet in a next subevent until a maximum number of subevents is transmitted. If the source device receives an acknowledgement of receipt of the packet, then the source device does not retransmit the packet to the sink device and the CIS event ends before transmitting a maximum number of subevents. If a transmission of a packet was acknowledged, the source device does not retransmit the packet to the sink device and the CIS event ends early and another communications protocol (e.g., Wi-Fi®) may begin communications in the isochronous interval before a next CIS event of the corresponding Connected Isochronous Group (CIG) begins.

If each CIS event in a CIG uses a maximum number of subevents, then the CIG will complete before another protocol (e.g., Wi-Fi) has an opportunity to communicate in the isochronous interval. However, if one or more of the CIS events in the CIG have a high-quality connection that does not require retransmissions, one or more gaps occur in the CIG event and another protocol may transmit during those gaps, resulting in fragmentation of bandwidth utilization. Such fragmented bandwidth utilization increases the number of radio switching delays in an isochronous interval, thereby degrading performance (e.g., throughput) of the BLE communications or communications using the other protocol. Accordingly, improved techniques for communicating isochronous data are desired.

SUMMARY OF EMBODIMENTS OF THE INVENTION

In at least one embodiment, a method for multi-protocol communications between wireless communications devices using a wireless communications interface includes placing in an isochronous group event, by a first wireless communications device, at least one subevent for each isochronous stream of a plurality of isochronous streams of an isochronous group based on a historical retransmission rate for each isochronous stream of the plurality of isochronous streams. The method may include counting retransmissions for each isochronous stream of the plurality of isochronous streams to thereby determine the historical retransmission rate for each isochronous stream of the plurality of isochronous streams. The at least one subevent may be placed in the isochronous group event in an order linearly related to the historical retransmission rate for each isochronous stream of the plurality of isochronous streams.

In an embodiment, a wireless communications system includes a first wireless communications device having a transmitter circuit and a controller circuit. The controller circuit is configured to cause the transmitter circuit to transmit, using an isochronous physical channel, at least one subevent for each isochronous stream of a plurality of isochronous streams of an isochronous group based on a historical retransmission rate for each isochronous stream of the plurality of isochronous streams. The controller circuit may include a storage element and a processor configured to execute instructions stored in the storage element. The instructions may be executable by the processor to cause the processor to place in an isochronous group event, the at least one subevent for each isochronous stream of the plurality of isochronous streams of the isochronous group based on the historical retransmission rate for each isochronous stream of the plurality of isochronous streams. The processor may be further configured to count retransmissions for each isochronous stream of the plurality of isochronous streams to thereby determine the historical retransmission rate for each isochronous stream of the plurality of isochronous streams.

In an embodiment, a method for communicating between devices using a wireless communications interface includes receiving at least one subevent for each isochronous stream of a plurality of isochronous streams of an isochronous group in an order based on a historical retransmission rate for each isochronous stream of the plurality of isochronous streams. The order may be linearly related to the historical retransmission rate of each of the plurality of isochronous streams of the isochronous group.

BRIEF DESCRIPTION OF THE DRAWINGS

The present invention may be better understood, and its numerous objects, features, and advantages made apparent to those skilled in the art by referencing the accompanying drawings.

FIG. 12 illustrates placement of subevents in a CIG event including two CISes based on historical retransmission rates consistent with at least one embodiment of the invention.

FIG. 13 illustrates a best-case scenario placement of subevents in a CIG event including two CISes based on historical retransmission rates consistent with at least one embodiment of the invention.

The use of the same reference symbols in different drawings indicates similar or identical items.

DETAILED DESCRIPTION

A multi-protocol wireless communications system uses prioritization of isochronous streams to increase the reliability and improve bandwidth utilization. Placement of subevents in an isochronous interval according to link quality reduces fragmentation of the isochronous interval.

Figure 1:
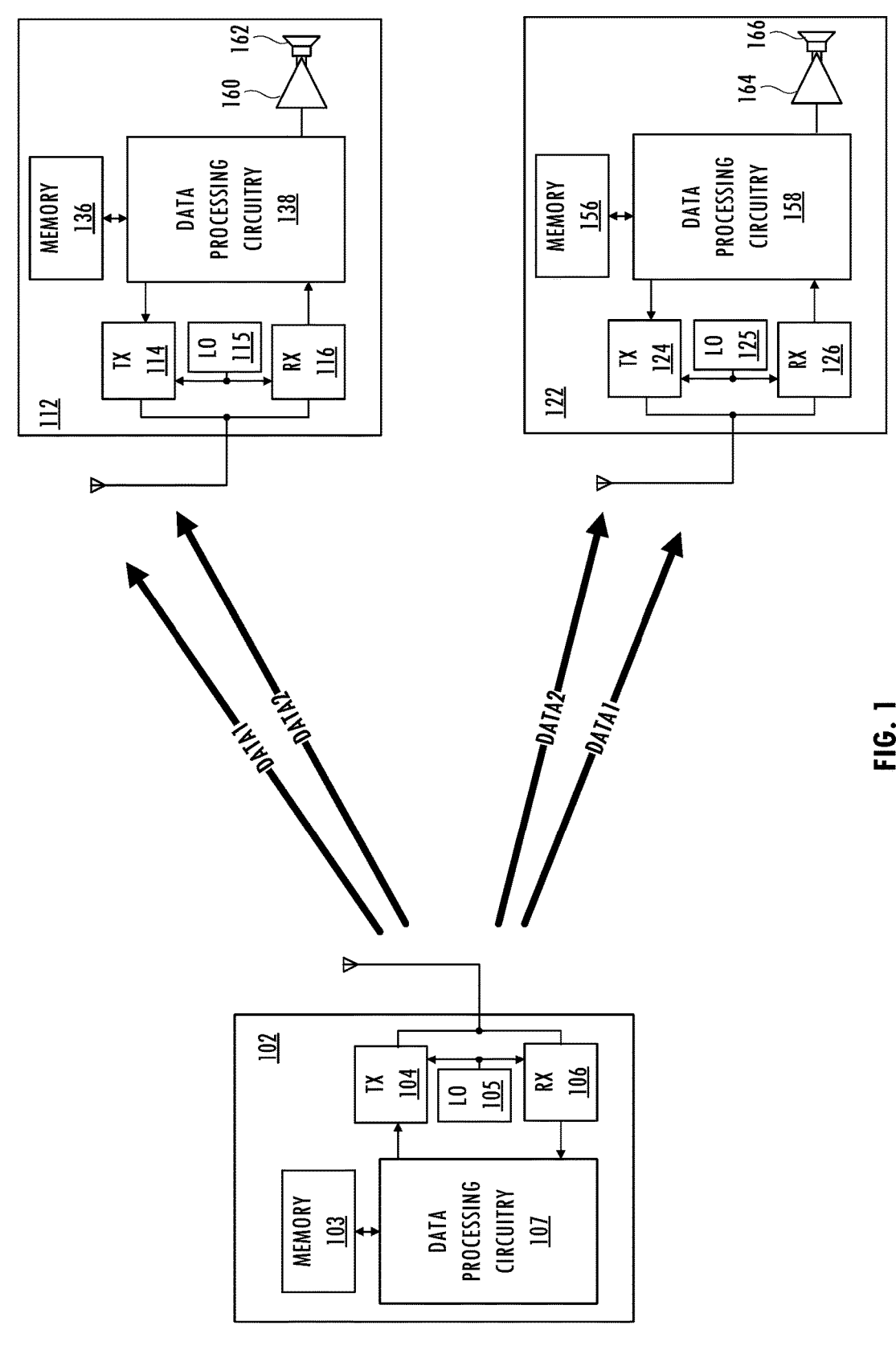
FIG. 1 illustrates a functional block diagram of an exemplary wireless communications system.

Referring to FIG. 1 in at least one embodiment, a wireless communications system includes wireless communications device 102, wireless communications device 112, and wireless communications device 122, which are devices compliant with the BLE communications protocol. Wireless communications device 102 includes transmitter 104, receiver 106, data processing circuitry 107, memory 103, and local oscillator 105. Wireless communications device 112 includes transmitter 114, receiver 116, data processing circuitry 138, memory 136, and local oscillator 115. Wireless communications device 122 includes transmitter 124, receiver 126, data processing circuitry 158, memory 156, and local oscillator 125. Wireless communications system 100 is compliant with the Bluetooth Core Specification Version 5.2 or later. Local oscillator 105, local oscillator 115, and local oscillator 125 provide signals used in transceiver functions of wireless communications device 102, wireless communications device 112, and wireless communications device 122, respectively.

In at least one embodiment, transmitter 114, receiver 116, local oscillator 115, data processing circuitry 138, and memory 136 are included in a controller implementing a physical layer (RF and PHY), which controls radio frequency communications, and a link layer of a BLE device. In an embodiment of wireless communications system 100, wireless communications device 112 and wireless communications device 122 are BLE audio devices (e.g., earbuds) and data processing circuitry 138 and data processing circuitry 158 provide signals to driver 160 and driver 164, respectively, which drive transducer 162 and transducer 166, respectively, to generate audio signals. In some embodiments, wireless communications device 112 and wireless communications device 122 are hearing aid devices and include at least one microphone (not shown), telecoil, or sensor coupled to data processing circuitry 138 or data processing circuitry 158.

Figures 2A, 2B:
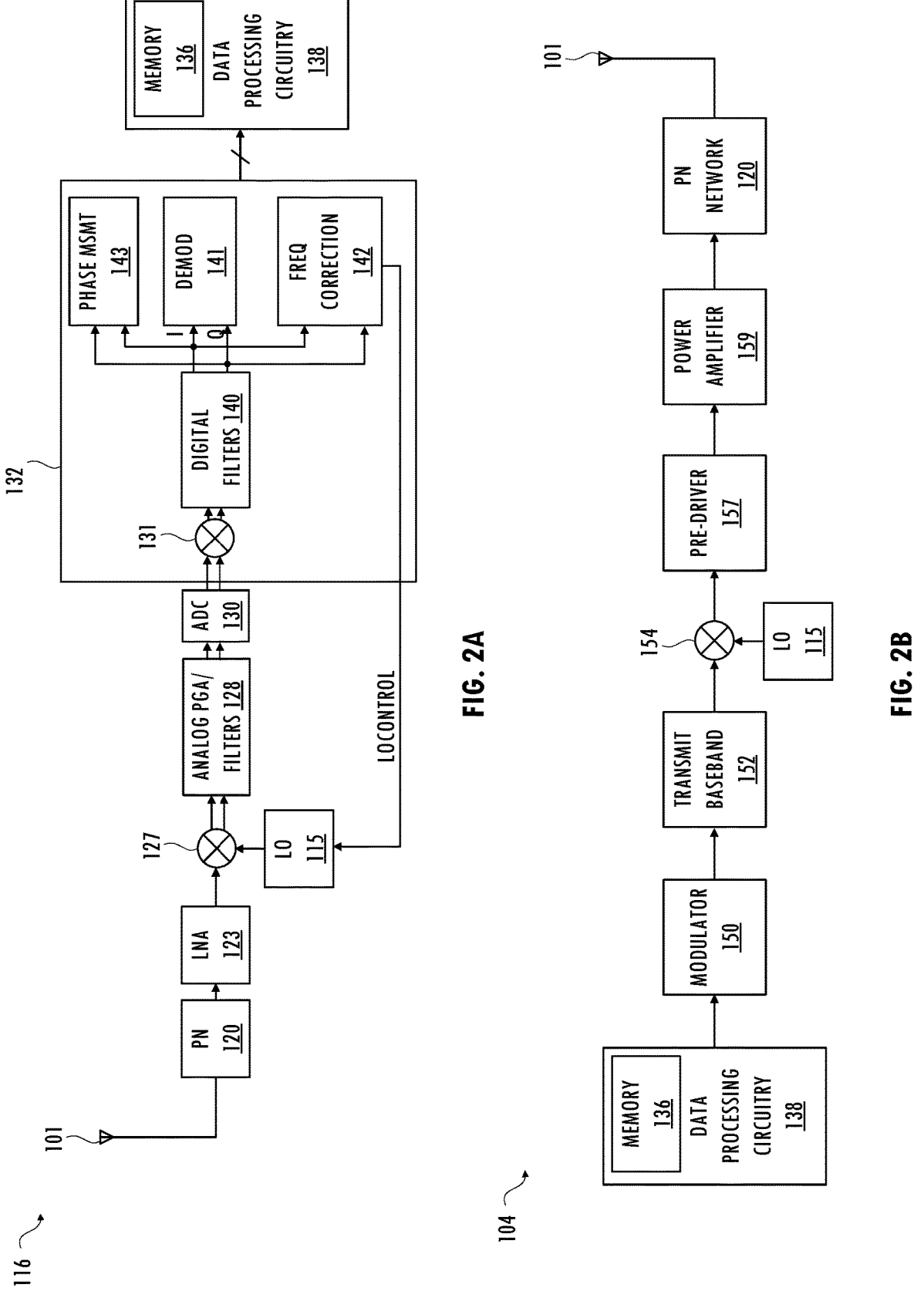
FIG. 2A illustrates a functional block diagram of an exemplary receiver portion of the wireless communications system of FIG. 1.
FIG. 2B illustrates a functional block diagram of an exemplary transmitter portion of the wireless communications system of FIG. 1.

FIG. 2A illustrates an exemplary embodiment of a receiver that may be included in a physical radio of wireless communications device 102, wireless communications device 112, or wireless communications device 122. Antenna 101 provides an RF signal to passive network 120, which provides impedance matching, filtering, and electrostatic discharge protection. Passive network 120 is coupled to low-noise amplifier (LNA) 123, which amplifies the RF signal without substantial degradation to the signal-to-noise ratio and provides the amplified RF signal to frequency mixer 127. Frequency mixer 127 performs frequency translation or shifting of the RF signal using a reference or local oscillator (LO) signal provided by local oscillator 115. For example, in at least one operational mode of receiver 116, frequency mixer 127 translates the RF signal from a 2.4 GHz frequency band to baseband frequencies centered at DC (i.e., zero-intermediate frequency (ZIF) in a ZIF mode of operation). In another operational mode, receiver 116 is configured as a low-intermediate frequency (LIF) receiver (i.e., in a LIF mode of operation) and frequency mixer 127 translates the RF signal to a low-intermediate frequency (e.g., 100-200 kHz) to avoid DC offset and 1/f noise problems of ZIF receivers.

Frequency mixer 127 provides the translated output signal as a set of two signals, an in-phase (I) signal, and a quadrature (Q) signal. The I and Q signals are analog time-domain signals. In at least one embodiment of receiver 116, the analog amplifiers and filters 128 provide amplified and filtered versions of the I and Q signals to analog-to-digital converter (ADC) 130, which converts those versions of the I and Q signals to digital I and Q signals (i.e., I and Q samples). Exemplary embodiments of ADC 130 use a variety of signal conversion techniques (e.g., delta-sigma (i.e., sigma-delta) analog to digital conversion). ADC 130 provides the digital I and Q signals to signal processing circuitry 132. In general, signal processing circuitry 132 performs processing (e.g., demodulation, frequency translation (e.g., using mixer 131), filtering (e.g., digital filters 140), or signal correction) of the digital I and Q signals. In at least one embodiment, signal processing circuitry 132 includes demodulator 141, which retrieves or extracts information from digital I and Q signals (e.g., data signals, that were modulated by a transmitter (not shown) and provided to antenna 101 as RF signals). In at least one embodiment, one or more circuits of signal processing circuitry 132 converts digital I and Q signals from a Cartesian representation into polar representation (i.e., instantaneous phase and instantaneous amplitude) for use by frequency correction circuit 142 or phase measurement circuit 143.

Data processing circuitry 138 may perform a variety of functions (e.g., logic, arithmetic, etc.). For example, data processing circuitry 138 may use the demodulated data in a program, routine, or algorithm (whether in software, firmware, hardware, or a combination thereof) to perform desired control or data processing tasks. In at least one embodiment, data processing circuitry 138, which includes memory 136, controls other circuitry, sub-system, or systems (not shown). In an embodiment, data processing circuitry 138 implements a BLE link layer that includes a state machine, defines state transitions, defines packet formats, performs scheduling, performs radio control, and provides link-layer decryption consistent with the BLE protocol.

FIG. 2B illustrates an exemplary embodiment of a transmitter that may be included in a physical radio of wireless communications device 102, wireless communications device 112, or wireless communications device 122 of FIG. 1. Data processing circuitry 138 of FIG. 2B may perform a variety of functions (e.g., logic, arithmetic, etc.). For example, data processing circuitry 138 executes a program, routine, or algorithm (whether in software, firmware, hardware, or a combination thereof) that performs desired control or data processing tasks consistent with the BLE physical layer and provides data to modulator 150. In an embodiment, modulator 150 implements Gaussian Frequency Shift Keying (GFSK) modulation. Modulator 150 provides the modulated data to transmit baseband circuit 152, which in an embodiment includes a digital-to-analog converter and analog programmable gain filters. Transmit baseband circuit 152 provides the baseband (or intermediate frequency (IF)) signal to frequency mixer 154, which performs frequency translation or shifting of the baseband signal using a reference or local oscillator (LO) signal provided by local oscillator 115. In at least one operational mode of receiver 116, frequency mixer 154 translates the baseband signal centered at DC to a 2.4 GHz frequency band. Pre-driver 157 amplifies the signal generated by frequency mixer 154 to a level sufficient for power amplifier 159. Power amplifier 159 further amplifies the signal to provide a higher power signal sufficient to drive passive network 120 and antenna 101. Passive network 120 provides impedance matching, filtering, and electrostatic discharge protection.

Figure 3A:
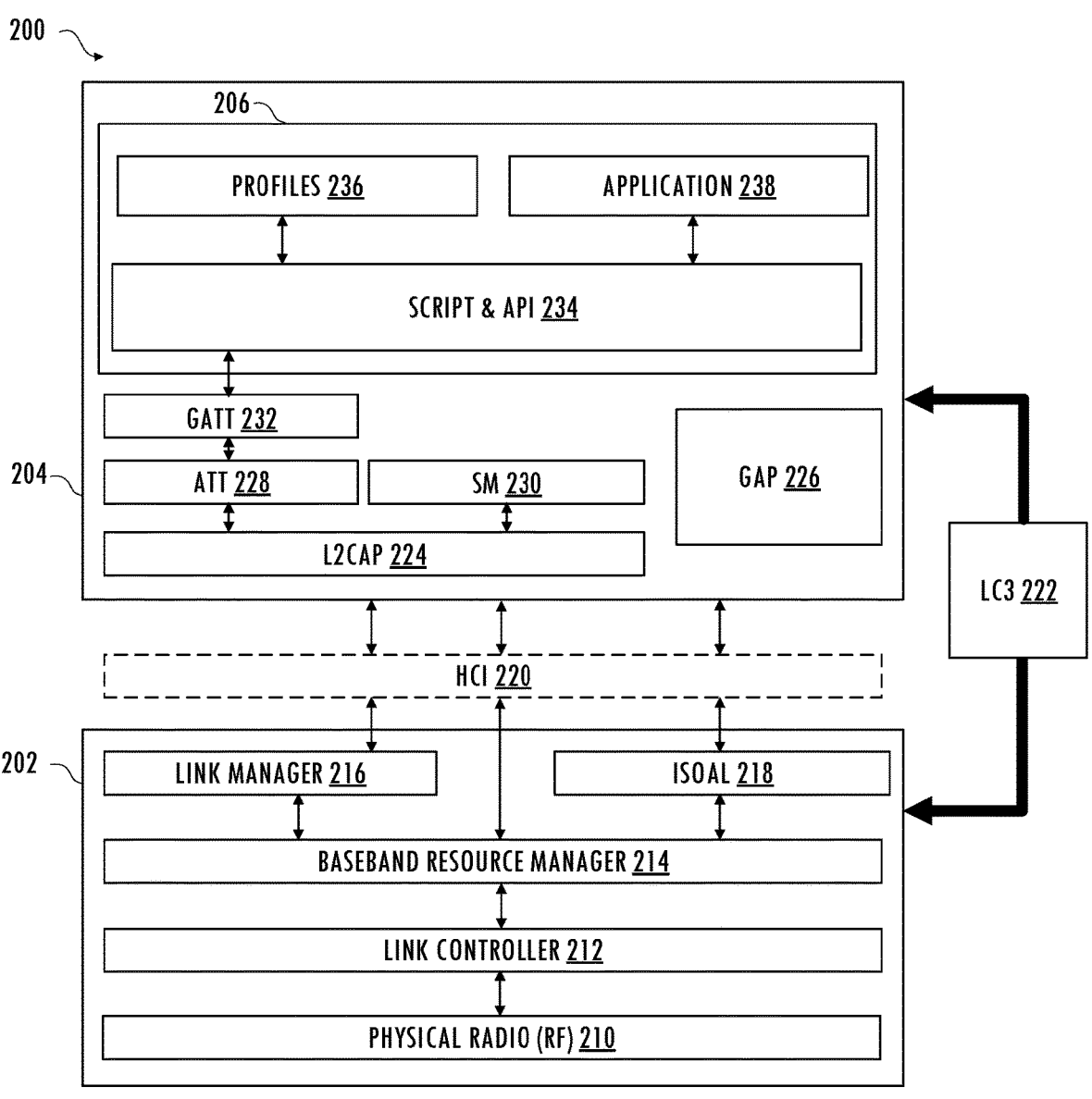
FIG. 3A illustrates a functional block diagram of portions of an exemplary communications device configured for BLE communications.

Referring to FIG. 3A, each wireless communications device of a BLE communications system implements the BLE architecture, e.g., using separate integrated circuit devices for controller 202 and host 204. In some embodiments, wireless communications device 200 incorporates functionality of controller 202 and host 204 in a single integrated circuit device. Controller 202 includes physical radio (RF) 210 and link controller 212, which are responsible for sending packets over the air by defining the use of a radio, including modulation schemes, frequency bands, channel use, and transmitter and receiver characteristics, e.g., as described in Bluetooth Core Specification Version 5.3, Vol. 6: Low Energy Controller. Physical radio (RF) 210 transmits and receives packets of information using the physical channel and transforms a stream of data to and from the physical channel and the baseband into required formats. The physical layer defines the use of a radio (e.g., the transmitter and receiver described above), including modulation schemes, frequency bands, channel use, and transmitter and receiver characteristics. Link controller 212 implements a link layer protocol, which defines the air interface packet formats, bit stream processing procedures, a state machine and protocols of over-the-air communication, and link control. Link controller 212 encodes and decodes packets from a data payload and parameters related to a physical channel, logical transport, and logical link.

Baseband resource manager 214 negotiates access contracts, i.e., commitments to deliver a predetermined QoS that is required by a user application to provide expected performance. Baseband resource manager 214 also includes a scheduler that grants time on physical channels to entities that have negotiated an access contract. Isochronous Adaptation Layer (ISOAL) 218 converts between upper layer data units and lower layer data units, e.g., using fragmentation and recombination or segmentation and reassembly operations. ISOAL allows the size of isochronous data packets as created and consumed by upper layers of the architecture to be different from the size of data packets used by the link layer. In addition, ISOAL allows an upper layer to use timing intervals that differ from those used by the link layer so that the rate of Service Data Units (SDUs) exchanged with the upper layers is not the same as the rate with which they are exchanged with the link layer. Link manager 216 creates, modifies, and releases logical links (and associated logical transports, if required) and updates parameters related to physical links between devices. In an embodiment, wireless communications device 112 implements Host-to-Controller Interface (HCI) 220, which is a standard service interface.

In an embodiment, host 204 includes Generic Audio Framework (GAF) 206, Logical Link Control and Adaptation Protocol (L2CAP) resource manager 224, Attribute Protocol (ATT) 228, Generic Attribute Protocol (GATT) 232, Generic Access Profile (GAP) 226, and Security Manager (SM) 230. L2CAP resource manager 224 manages ordering of submission of PDU fragments and some relative scheduling between channels to ensure that L2CAP channels with QoS commitments are not denied access to the physical channel due to controller resource exhaustion. L2CAP resource manager 224 polices traffic to ensure that applications submit L2CAP SDUs within bounds of negotiated QoS settings. In an exemplary wireless communications device 200, GATT 232 defines the way that two BLE devices communicate data using services and characteristics. In an embodiment, GATT 232 uses a generic data protocol stored in ATT 228, which is used to store services, characteristics and related data in a simple lookup table using 16-bit identifiers for each entry in the table. SM 230 implements a peer-to-peer protocol for generating encryption keys and identity keys and generates random addresses and resolves random addresses to known device identities. SM 230 provides stored keys to controller 202 for encryption and authentication during encryption or pairing procedures. GAP 226 represents base functionality common to all Bluetooth devices, e.g., modes and access procedures used by transports, protocols, and application profiles. GAP services include device discovery, connection modes, security authentication, associate models and service discovery. GAF 206 includes Script and API 234, application 238, and profiles 236, which adds application specific information to GAF 206. For example, profiles 236 includes hearing access profile (HAP) and hearing access service (HAS), which provide applications for a hearing aid ecosystem, profiles 236 includes telephony and media audio profile (TMAP), which specifies higher quality codec settings and more complex media and telephony control, and profiles 236 includes public broadcast profile (PBP), which facilitates selecting globally interoperable broadcast systems.

Low complexity communications codec (LC3) 222 includes a codec for high performance telephony speech, wideband and super-wideband speech, and high-quality audio. LC3 222 encodes audio data into different channel streams (e.g., stereo is encoded as separate left and right streams). LC3 222 provides audio data as SDUs to the link layer, which generates PDUs for isochronous data streams. The link layer provides SDUs based on received PDUs to LC3 222 for decoding.

Figure 3B:
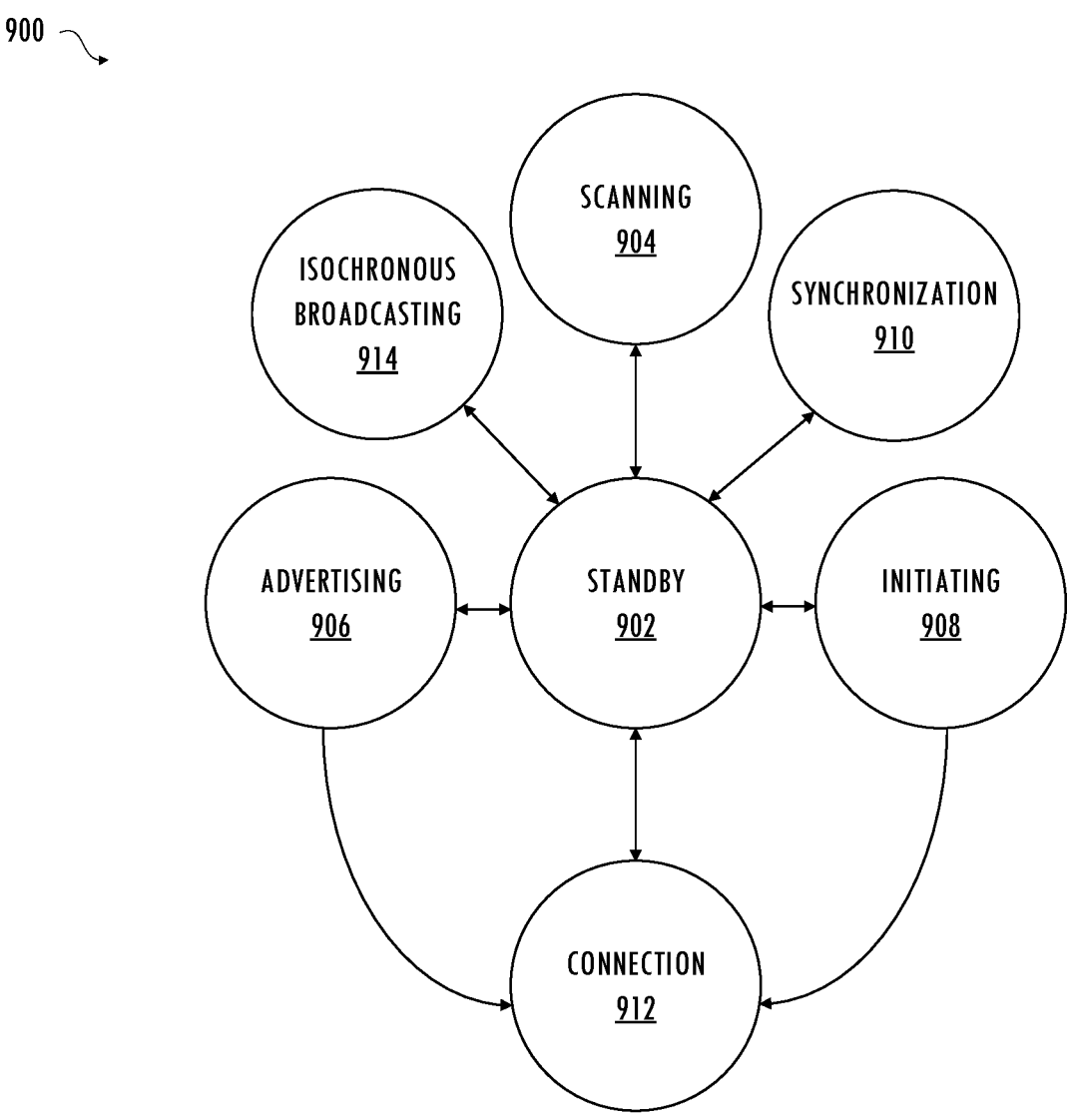
FIG. 3B illustrates an exemplary state diagram of a link layer implemented by link controller 212 of FIG. 3A.

FIG. 3B illustrates an exemplary state machine implemented by a link layer including standby state 902, scanning state 904 or advertising state 906, initiating state 908, synchronization state 910, connection state 912, and isochronous broadcasting state 914. Only one state of the link layer is active at a time. Link layer state machine 900 can enter standby state 902 from any other state. In standby state, 902, the link layer does not transmit any packets. Link layer state machine 900 may enter advertising state 906 from standby state 902. In advertising state 906, the link layer transmits advertising physical channel packets and may listen to and respond to a response triggered by the advertising physical channel packets. Link layer state machine 900 may enter scanning state 904 from standby state 902. In scanning state 904, the link layer listens for advertising physical channel packets from devices that are advertising. Link layer state machine 900 may enter initiating state 908 from standby state 902. In initiating state 908, the link layer listens for advertising physical channel packets from a specific device and responds to these packets to initiate a connection with another device. Link layer state machine 900 may enter synchronization state 910 from standby state 902. In synchronization state 910, the link layer listens for periodic channel packets forming a specific periodic advertising train transmitted by a specified device (e.g., a host may direct the link layer to listen for isochronous data packets coming from a specified device that is transmitting a broadcast isochronous group (BIG)). Link layer state machine 900 may enter isochronous broadcasting state 914 from standby state 902. In isochronous broadcasting state 914, the link layer transmits isochronous data packets on an isochronous physical channel.

Link layer state machine 900 may enter connection state 912 from initiating state 908 or advertising state 906. When entering connection state 912 from initiating state 908, the connection state is the central role (i.e., the wireless communications device is configured as a central device) and the wireless communications device communicates with another wireless communications device having a connection state of a peripheral role (i.e., the other wireless communications device is configured as a peripheral device) and defines the timings of transmissions. When entering connection state 912 from advertising state 906, the connection state is the peripheral role and the link layer communicates with a single other wireless communications device configured in the central role. In some embodiments, during connection state 912, the link layer transmits data physical channel PDUs in connection events. A connection event typically contains at least one packet sent by the central device. The same data channel index is used for all packets in a connection event. In some embodiments, during a connection event, the central device and peripheral device alternate sending and receiving packets.

In an embodiment, the link layer uses one physical channel (RF channel) at a time. Each transmission on a physical channel is associated with corresponding access address. In general, two wireless communications devices use a shared physical channel to communicate with each other. Whenever the link layer of a wireless communications device is synchronized to the timing, frequency, and access address of a physical channel, the link layer is connected on the data physical channel or synchronized to a periodic physical channel or an isochronous physical channel regardless of whether it is actively involved in communications over the channel. The link layer generates a new access address for each CIS it creates. Connections are exclusive, i.e., a peripheral device can be connected to only one central device at a time. As soon as a peripheral device connects to a central device, it stops advertising itself and other wireless communications devices are no longer able to see it or connect to it until the existing connection is broken.

Figure 3C:
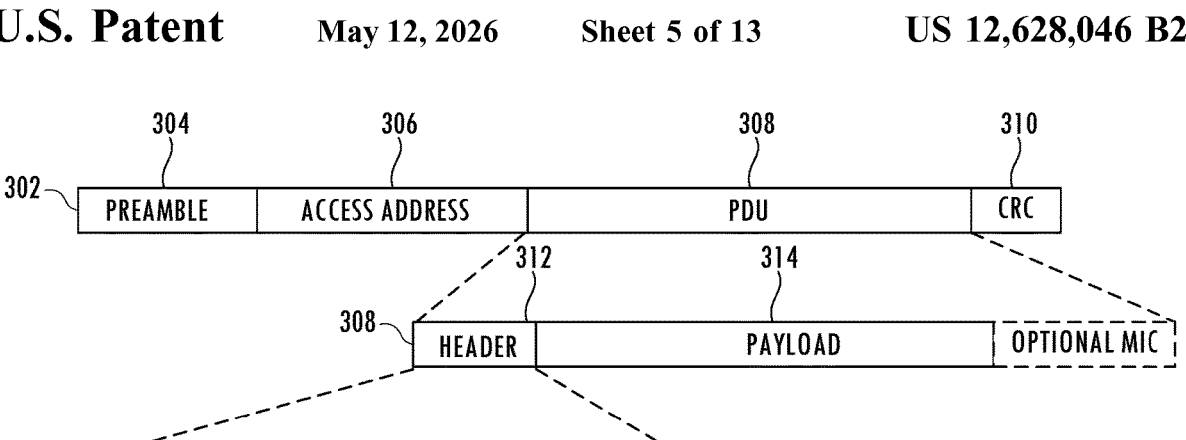
FIG. 3C illustrates a format of an Asynchronous Connection Link packet.

FIG. 3C illustrates an exemplary BLE ACL radio packet for transmitting data by a wireless communications device. Packet 302 includes preamble 304 (e.g., 1 or 2 octets), access address 306 (e.g., 4 octets), PDU 308 (e.g., 2-257 octets) and cyclic redundancy check (CRC) 310 (e.g., 3 octets). PDU 308 includes header 312 (e.g., 16 bits), payload 314 (e.g., 0-251 octets), and an optional Message Integrity Check (e.g., 32 bits). Header 312 includes seven or eight fields: LLID indicates the type of content of the payload field of the PDU, e.g., whether the packet is a link layer data PDU or a link layer control PDU (e.g., 2 bits), Next Expected Sequence Number (e.g., 1 bit), Sequence Number (1 bit), More Data (e.g., 1 bit), CTEInfo Present (e.g., 1 bit), Reserved for Future Use bits (e.g., 2 bits), Length (e.g., 8 bits), and CTEInfo indicating a type and length of a Constant Tone Extension (if present, e.g., 8 bits).

Figure 3D:
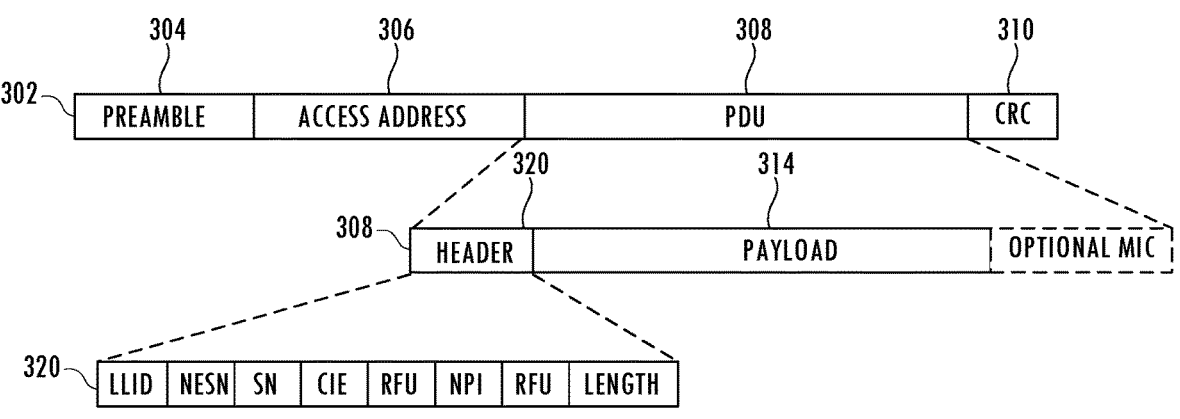
FIG. 3D illustrates a format of a Connected Isochronous Stream (CIS) packet.

FIG. 3D illustrates an exemplary BLE CIS radio packet for transmitting data by a wireless communications device. CIS packet 302 includes preamble 304 (e.g., 1 or 2 octets), access address 306 (e.g., 4 octets), PDU 308 (e.g., 2-257 octets) and cyclic redundancy check (CRC) 310 (e.g., 3 octets). PDU 308 includes header 320 (e.g., 16 bits), payload 314 (e.g., 0-251 octets), and an optional Message Integrity Check (e.g., 32 bits). Header 320 includes Link Layer ID (2 bits), Next Expected Sequence Number (e.g., 1 bit), Sequence Number (1 bit), Close Isochronous Event bit (e.g., 1 bit), Reserved for Future Use bits (e.g., 2 non-contiguous bits), Null Payload Indicator (e.g., 1 bit), and Length (e.g., 8 bits). Three of the four possible states (e.g., 0b00, 0b01, and 0b10) of two Link Layer ID bits indicate the type of content of the payload field of the PDU, e.g., whether the packet is a link layer data PDU or a link layer control PDU. A fourth state of the LLID bits (e.g., 0b11) is reserved for future use. The CIE bit indicates whether a source device has received an acknowledgment from the sink device confirming that the packet was successfully received by the sink device so that the source device will stop further retransmissions of that PDU. An early CIE bit allows the sink device to go to sleep until the next Isochronous Interval, allowing the source device to perform other tasks. In an embodiment, in response to the CIE bit being set, the sink device saves power by turning off its receiver until the next isochronous interval. The NPI bit indicates whether the packet is a CIS data PDU or a CIS null PDU (i.e., indicates whether data is being transmitted in the packet).

Figure 3E:
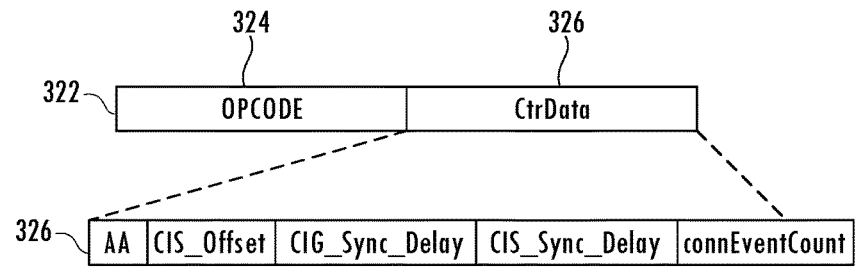
FIG. 3E illustrates a format of a Link Layer Control Protocol Data Unit and associated control data field.

Referring to FIG. 3E, in general, the link layer communicates control information to the physical layer using a Data Physical Channel PDU having payload 322. Payload 322 includes opcode 324 (e.g., one octet), which identifies a type of link layer control PDU, and control data field 326 (e.g., 0-250 octets). An exemplary LL_CIS_IND PDU includes control data field 326, which includes an Access Address (AA) field of the isochronous stream generated by the link layer following rules specified in BT Core Spec V. 5.3, Vol. 6, Part B. The link layer sets the CIS_Offset field to the time, in microseconds, from an asynchronous link anchor point (i.e., start point) of the connection event that is referenced by connEventCount to the first isochronous stream anchor point. The link layer sets the CIG_Sync_Delay field to the value of CIG_Sync_Delay, e.g., the time from the isochronous stream anchor point to the isochronous group synchronization point, in microseconds. The link layer sets the connEventCount field to a connection event counter value that satisfies the following relationship: currEvent−$2^{14}$<connEventCount<currEvent+$2^{14}$ (modulo 65536), where currEvent is an ACL connection event counter value for the connection event where the LL_CIS_IND PDU is being transmitted. The link layer sets the connEventCount should be set to a value greater than currEvent of the event in which the LL_CIS_IND PDU is first transmitted.

Referring back to FIG. 1, in an embodiment of wireless communications system 100, wireless communications device 102 is configured as a central device, which sets up schedules, manages isochronous streams, and sends commands. Wireless communications device 112 and wireless communications device 122 are configured as peripheral devices, which participate in streams and respond to commands. In an embodiment, wireless communications device 112 and wireless communications device 122 are small, wearable devices that communicate with wireless communications device 102 when they come within a predetermined distance from wireless communications device 102. In an embodiment, wireless communications device 102 is a smartphone that sends multiple, independent, synchronized audio streams to wireless communications device 112 and wireless communications device 122 (e.g., smart speakers, headphones, or earbuds). In other embodiments, wireless communications device 112 and wireless communications device 122 are wireless speakers that are configured as different channels (e.g., front left channel, back left channel, front right channel, or back right channel).

In general, a connection event between BLE devices starts when a central device sends a packet to a peripheral device at a predetermined connection interval. The central device controls initiating and managing multiple connections with one or more peripheral device. The peripheral device can respond in a predetermined amount of time (e.g., 150 μs) after it has received a packet from the central device. If the peripheral device has no data to send, the peripheral device can skip a certain number of connection events defined by a peripheral latency parameter. If the central device or peripheral device does not receive any packets within a time defined by a supervision timeout, the corresponding device terminates the connection. In general, a connection event refers to a time within a timing-event reserved for sending or receiving packets.

Isochronous data exchange using a physical channel occurs at synchronized intervals referred to as isochronous connection events, which occur at a gap in an isochronous connection interval. Services break data up into logical entities and contain specific chunks of data called characteristics. Each service has a unique user ID (UUID). Characteristics can be read from the peripheral device or written to send data back to the peripheral device. For example, a CIS reserves transmission and reception periods known as subevents on an isochronous physical channel and can be configured to retransmit packets in subevents of a current or subsequent event. Each CIS event starts at a moment called the CIS anchor point (e.g., based on a clock of a central device) and ends when closed. The CIS anchor points are regularly spaced apart by an isochronous interval. A first subevent of a CIS event starts at the CIS anchor point. Consecutive CIS subevents start a subinterval apart. A subinterval is greater than or equal to the subevent length (SE_length). The subevent length equals equals MPT_C+T_IFS+MPT_P+T_MSS, where MPT_C and MPT_P are the time taken by the central device and peripheral device, respectively, to transmit a packet containing a CIS PDU with a payload of Max_PDU octets (for that direction) on the PHY being used for the CIS, where the Minimum Subevent Space (T_MSS) is 150 μs. These values should include the MIC if it is possible that the CIS will be encrypted. Each CIS is part of a CIG of one or more CISes having a common timing reference based on a clock of a central device. In at least one embodiment, the connection interval is 7.5 ms-4000 ms, connection latency is 0-500 connection intervals, and the supervision timeout is 100 ms-3200 ms. However, in other embodiments, different timing intervals are used.

In at least one embodiment, the central device and the peripheral device each include a 16-bit connection event counter used to synchronize link layer control procedures. The connection event counter includes the value connEventCount for each asynchronous connected link connection. Each counter is initialized to zero on the first connection event, is incremented by one for each new connection event, and wraps from 0xFFFF to 0x0000. The start of the connection event is called the anchor point. The central device starts to transmit a data physical channel PDU to a peripheral device at the anchor point.

Figure 4A:
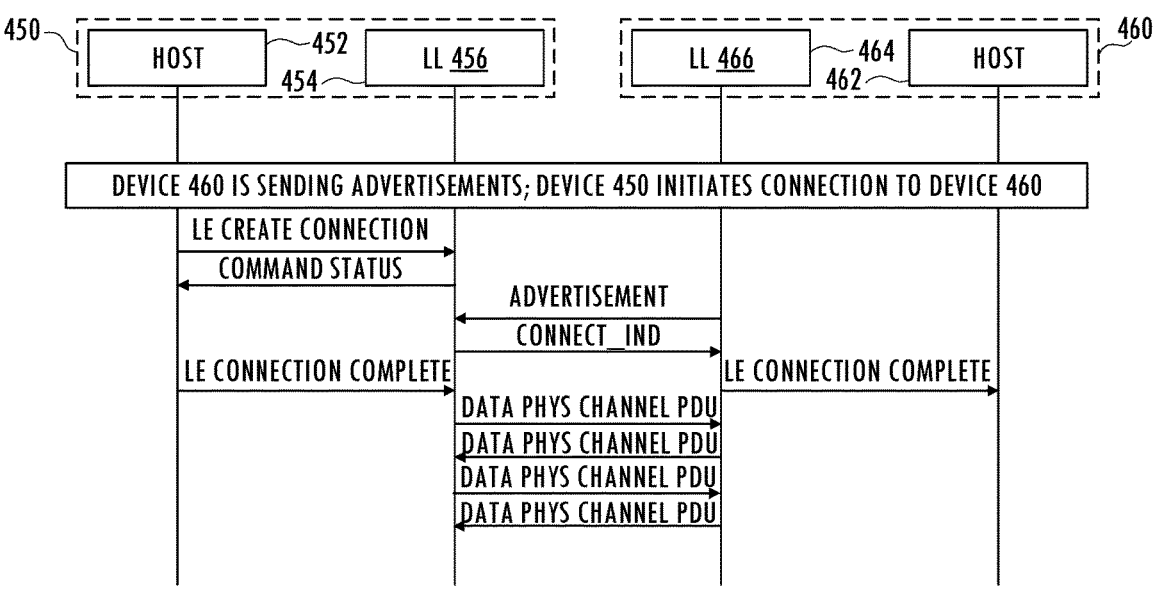
FIG. 4A illustrates an exemplary timing diagram for initiating a connection between two wireless communications devices in a conventional BLE communications system.

Referring to FIG. 4A, in at least one embodiment, wireless communications device 450 includes host 452 and controller 454 implementing link layer 456, and wireless communications device 460 includes host 462 and controller 464 implementing link layer 466. In an exemplary protocol, host 452 configures link layer 456 in an initiating state and host 462 configures link layer 466 in an advertising state. Host 452 instructs link layer 456 to create a connection (e.g., by sending an LE CREATE CONNECTION PDU message to link layer 456) and link layer 456 responds (e.g., by sending a COMMAND STATUS message) to host 452. Link layer 456 listens for advertisement PDUs. In an advertising state, link layer 466 transmits an advertisement PDU received by wireless communications device 450. In response to receiving the advertisement PDU, wireless communications device 450 initiates a connection to wireless communications device 460 (e.g., by sending a CONNECT_IND message). A successful initiation results in link layer 456 sending an LE CONNECTION COMPLETE message to host 452 and link layer 466 sending the LE CONNECTION COMPLETE message to host 462. Next, wireless communications device 450 and wireless communications device 460 communicate data physical channel PDUs. When wireless communications device 450 and wireless communications device 460 are in a connection, either wireless communications device can transmit data. For example, wireless communications device 450 and wireless communications device 460 alternate transmitting and receiving data physical channel PDU messages.

Figure 4B:
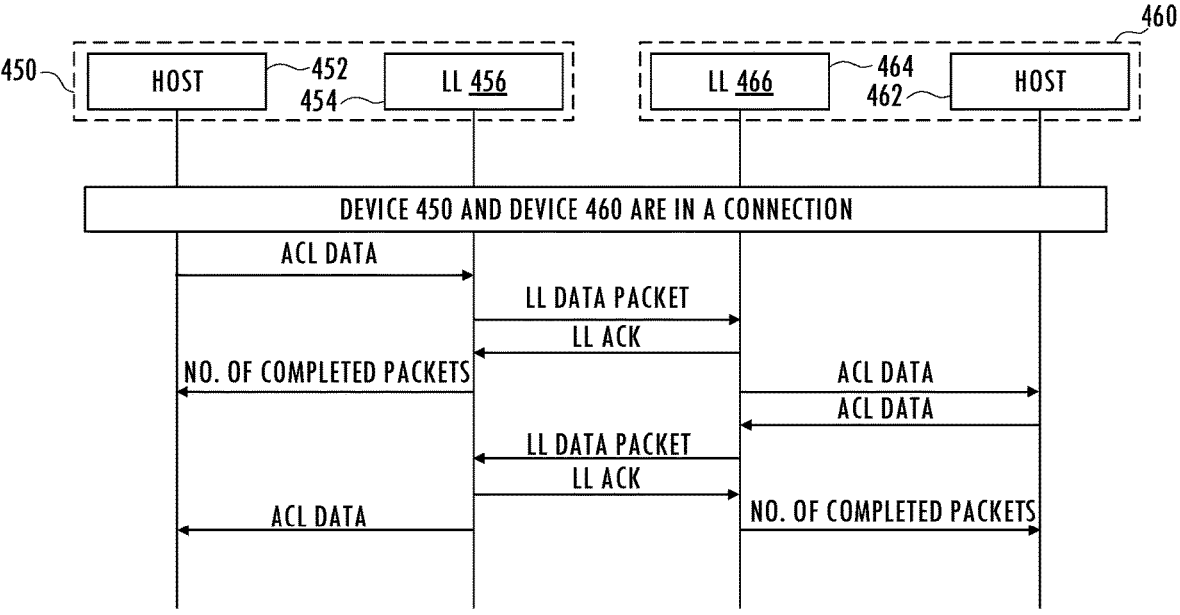
FIG. 4B illustrates an exemplary timing diagram for sending data between two wireless communications devices that are in a connection in a conventional BLE communications system.

Referring to FIG. 4B, in an embodiment, after establishing a connection, wireless communications device 450 and wireless communications device 460 communicate ACL data. For example, host 452 sends ACL data (e.g., ACL DATA message) to link layer 456 and link layer 456 sends the ACL data to link layer 466 (e.g., using an LL DATA PACKET message). Link layer 466 returns an acknowledgement ((e.g., LL ACK message) to link layer 456 and link layer 456 sends to host 452 a message indicating a number of data packets communicated. Link layer 466 sends the ACL data to host 462. Similarly, host 462 sends ACL data (e.g., ACL DATA message) to link layer 466 and link layer 466 sends the ACL data to link layer 456 (e.g., using an LL DATA PACKET message). Link layer 456 returns an acknowledgement (e.g., LL ACK message) to link layer 466 and link layer 466 sends to host 462 a message indicating a number of data packets communicated. Link layer 456 sends the ACL data to host 452.

Figure 5:
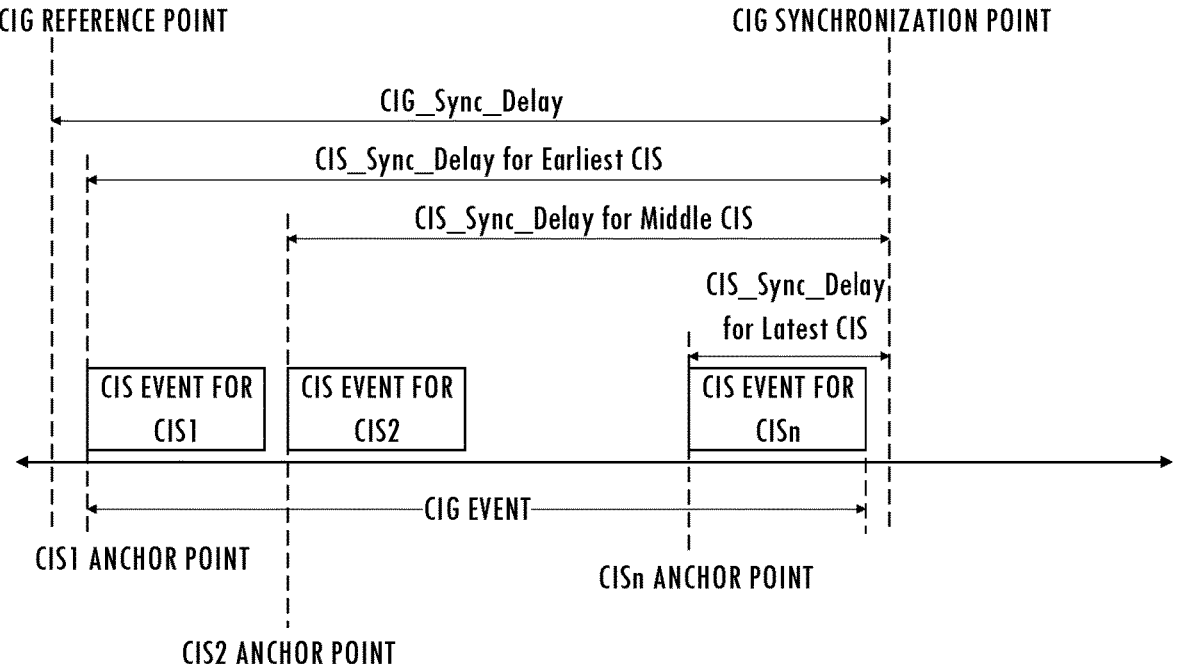
FIG. 5 illustrates placement of events in a CIS group event including three CISes.

FIG. 5 illustrates placement of CIS events in a CIG event. Multiple synchronized CISes form a CIG. A CIG includes two or more CISes that have the same isochronous interval (i.e., time between consecutive CIS anchor points) and are expected to have a time relationship at the application layer or of a single CIS. A CIG may have up to a maximum number of CISes (e.g., 31). The host of a central device assigns an identifier to each CIG (e.g., CIG_ID), which is sent to the host of a peripheral device via the link layer of the host device and the link layer of the peripheral device as part of creation of each CIS in the CIG but is not otherwise used by the link layer. On the central device, a CIG represents a data structure within the link layer and does not involve any connection separate from the CISes that are included in the CIG. On the peripheral device, a CIG represents those CISes with the same CIG_ID.

A CIG event includes the corresponding CIS events of each CIS in the CIG. Each CIG event starts at the anchor point of the earliest (in transmission order) CIS of the CIG and ends at the end of the last subevent of the latest CIS of the same CIG event. Two CIG events using the same CIG shall not overlap, i.e., the last CIS event of a CIG event shall end before the first CIS anchor point of the next CIG event. The link layer of the central device provides timing parameters (CIS_Sync_Delay and CIG_Sync_Delay) to the link layer(s) of the peripheral device(s). The timing parameters enable synchronization of isochronous data at the application layer. Each CIG Event has a CIG reference point and a CIG synchronization point that are CIG_Sync_Delay apart. Each CIG event starts no earlier than the CIG reference point and ends no later than the CIG synchronization point. For a CIS, the CIS anchor point is a fixed offset (greater than or equal to zero) after the CIG reference point. Thus, CIG reference points are spaced an ISO_Interval apart and CIG synchronization points are also spaced an ISO_interval apart.

For each CIS, CIS_Sync_Delay equals the time from the CIS anchor point to the CIG synchronization point. CIG_Sync_Delay is no less than the maximum possible time for a CIG event, i.e., the time from the CIG reference point to the end of the peripheral's packet in the last subevent when both central device and peripheral device transmit packets containing Max_PDU octets. CIG_Sync_Delay will have the same value for all CISes in the same CIG. CIS_Sync_Delay for each CIS equals CIG_Sync_Delay minus the offset from the CIG reference point to the CIS anchor point. The actual maximum possible time for a CIG event is not determined until all the CISes in the CIG have been created. Therefore, the value that the central device sends is an upper bound. The maximum possible time for a CIS event (i.e., CIS_Sync_Delay parameter) equals:

$$(NSE-1) \times \text{Sub\_Interval} + MPT\_C + T\_IFS + MPT\_P \text{ for that } CIS,$$

where the Time Inter Frame Space (T_IFS) Time is the interval between consecutive packets on same channel index. The CIS events included in a CIG event need not have the same values of a CIS event counter, but the difference between the counters will be the same for the lifetime of the CIG. Both a central device and a peripheral device include a CIS event counter for each CIS. The CIS event counter is set to 0 for a first CIS event of a CIS and is incremented by one for each CIS event whether or not the central device transmits any CIS PDUs during the event.

Figures 6A, 6B:
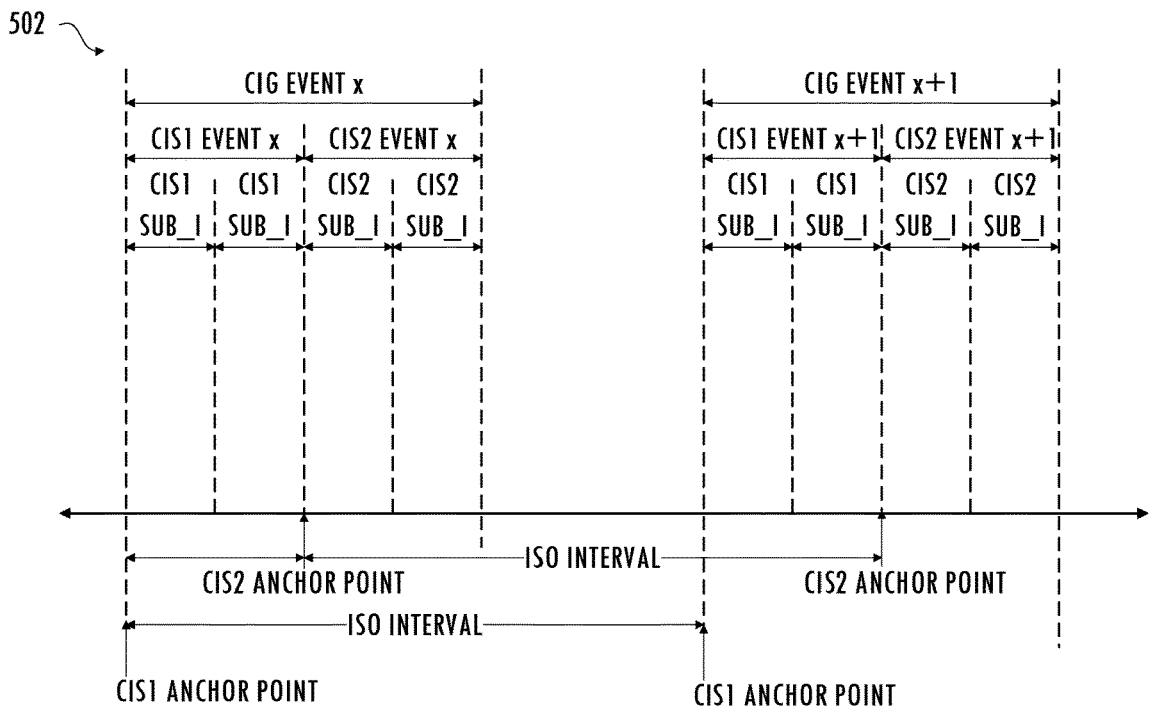
FIG. 6A illustrates a sequential placement of subevents in a Connected Isochronous Group (CIG) event including two CISes and a maximum of two subevents in each CIS event.
FIG. 6B illustrates an interleaved placement of subevents in a CIG event including two CISes and a maximum of two subevents in each CIS event.

A conventional link layer either sequentially arranges subevents of CIG events that include more than one CIS or interleaves subevents of the CIG by setting the values of the Sub_Interval and the spacing between the CIS anchor points appropriately. Referring to FIG. 6A, when configured for sequential arrangement of the CISes in a CIG, the link layer places CIS events of the different CISes so that they do not overlap and all the subevents of a CIS event are adjacent. For each adjacent pair of CISes, the interval between their CIS anchor points shall be at least NSE×Sub_Interval, using the values for the lower numbered CIS and where NSE is the maximum number of subevents in each CIS event. For example, a link layer generates arrangement 502 for a CIG with two CISes and NSE=2. Referring to FIG. 6B, when configured for interleaved arrangement of the CISes in a CIG, the link layer adjacently places all the first subevents of the CISes in the CIG event, followed by adjacently placing all second subevents in the CIG event, and so on. For each CIS, its value of Sub_Interval shall be at least the sum of the values of SE_Length for all the CISes in the CIG. For each adjacent pair of CISes, the interval between their CIS anchor points shall be at least SE_Length of the lower numbered CIS. For example, a link layer generates arrangement 522 for a CIG with two CISes and NSE=2.

Figure 7A:
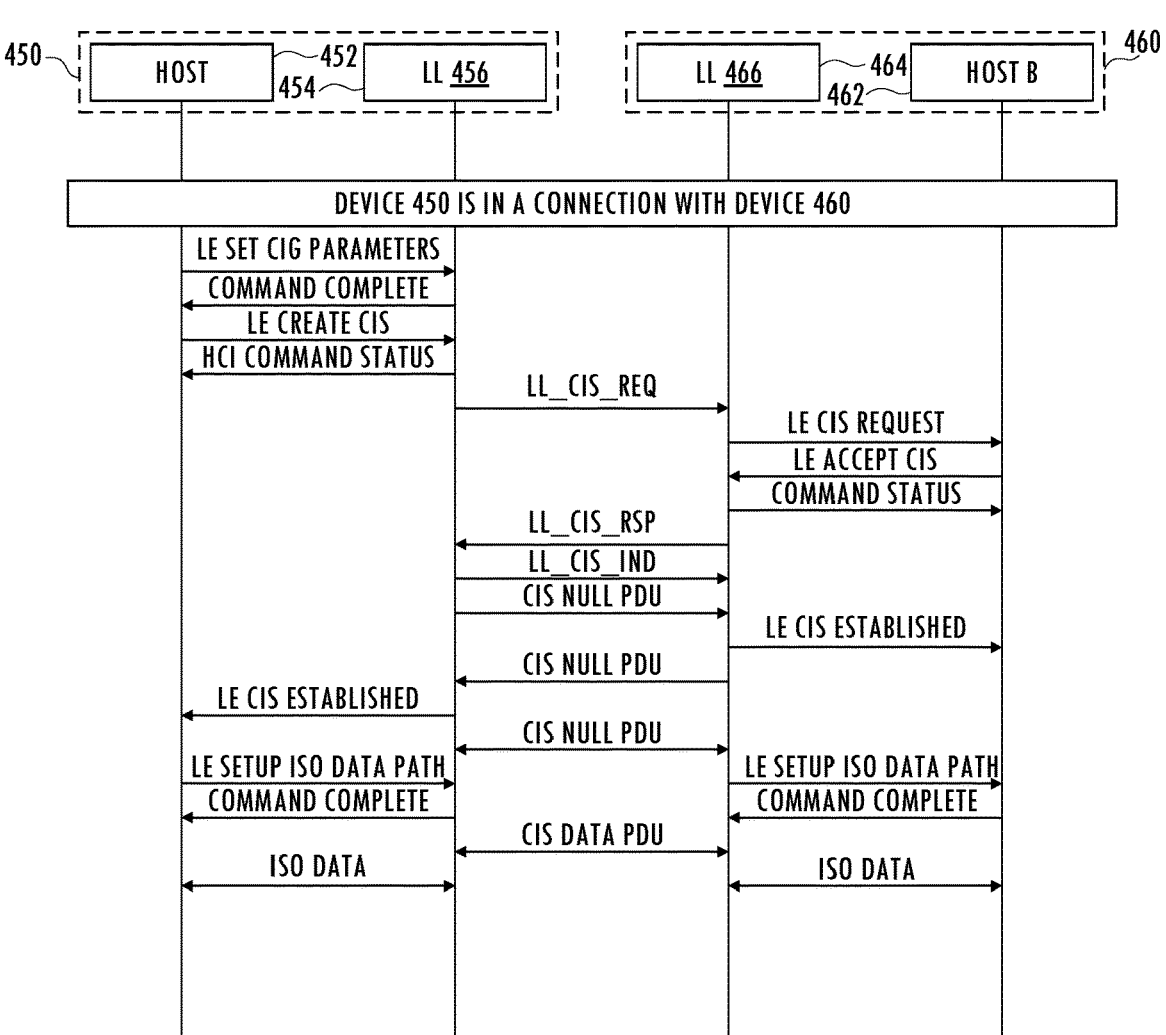
FIG. 7A illustrates a message sequence for a central device establishing a CIS with a peripheral device.
Figure 7B:
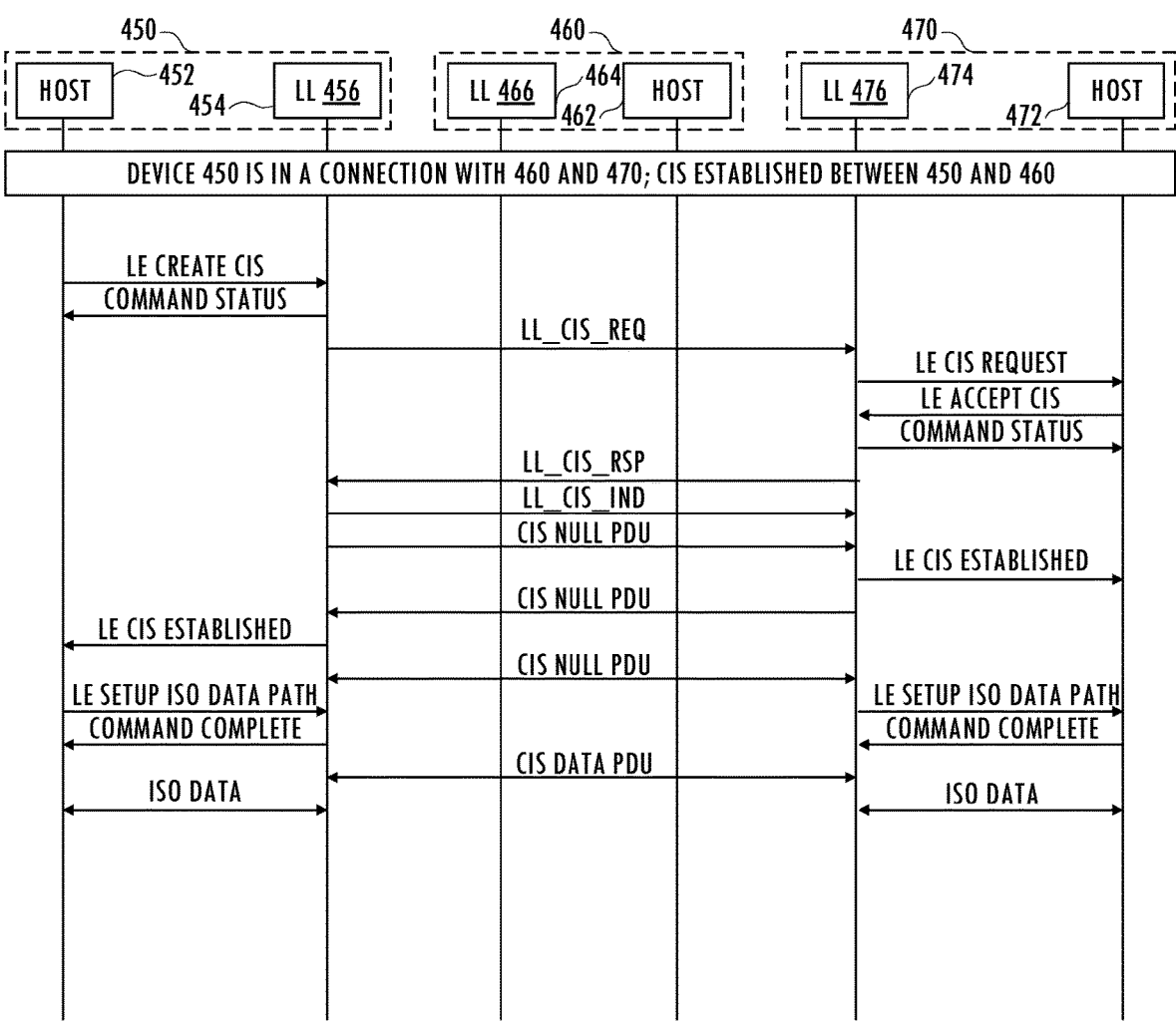
FIG. 7B illustrates a message sequence for the central device of FIG. 7A establishing a CIS with an additional peripheral device.

Referring to FIGS. 7A and 7B, in at least one embodiment, after establishing a connection, wireless communications device 450, which is configured as a central device, sets up a CIG with parameters for one or more CIS. Wireless communications device 450 then establishes a CIS between wireless communications device 450 and wireless communications device 460, which is configured as a peripheral device, that culminates in communications of CIS data PDUs and isochronous data between the link layers and corresponding hosts. The connected isochronous stream is established using a sequence of messages communicated between host 452 of wireless communications device 450, link layer 456 of wireless communications device 450, link layer 466 implemented by controller 464 of wireless communications device 460, and host 462 of wireless communications device 460.

In some embodiments, wireless communications device 450 then establishes at least one additional CIS between wireless communications device 450 and wireless communications device 470, which is configured as another peripheral device, that culminates in communications of CIS data PDUs and isochronous data between the link layer of wireless communications device 450 and the link layer of wireless communications device 470 and corresponding hosts. The CIS is established by the wireless communications device 450 and wireless communications device 470 using a sequence of messages communicated between host 452 of wireless communications device 450, link layer 456 of wireless communications device 450, link layer 476 implemented by controller 474 of wireless communications device 470, and host 472 of wireless communications device 470.

Figures 8, 9:
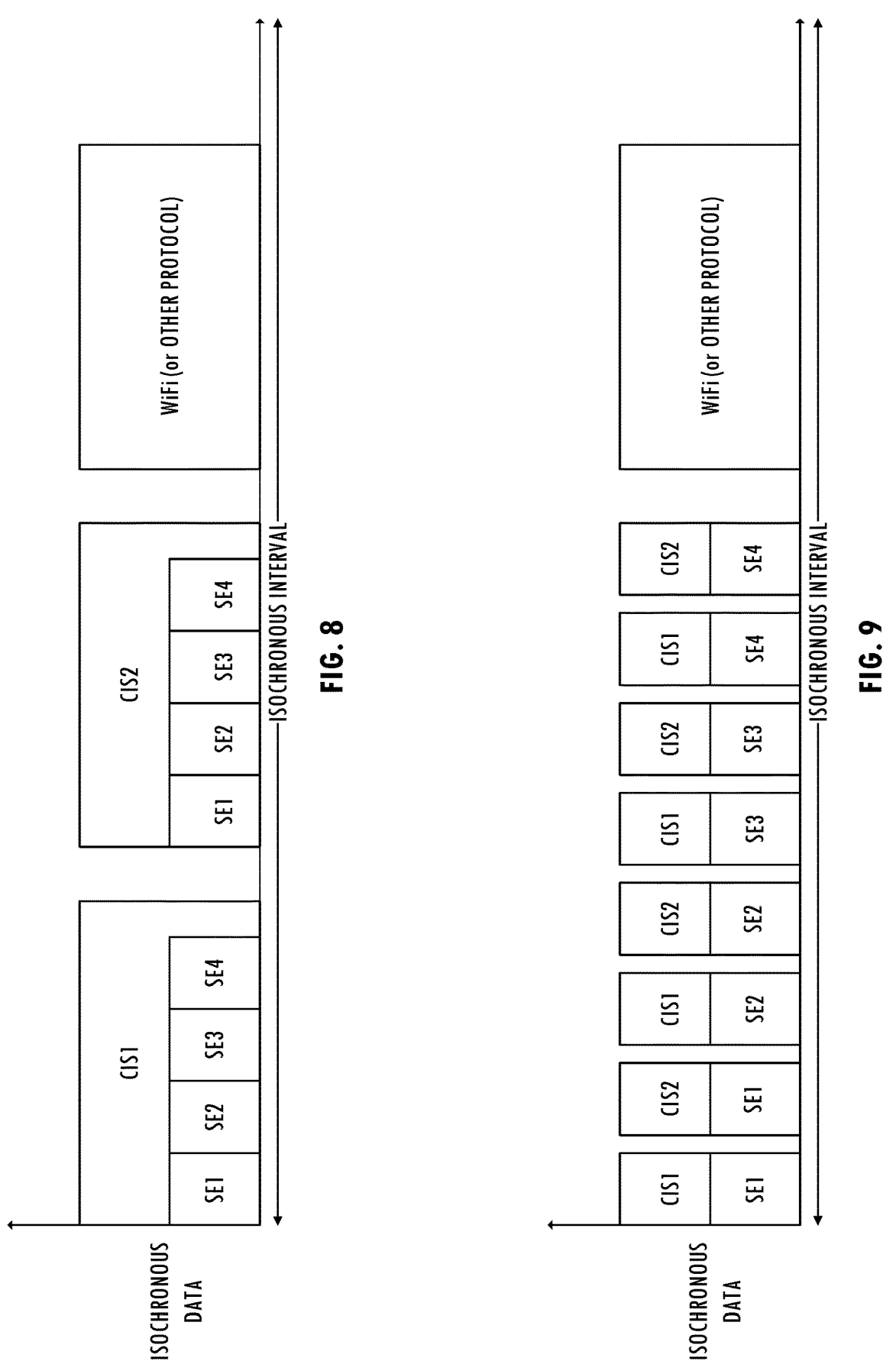
FIG. 8 illustrates a sequential placement of subevents in a CIG event including two CISes and a maximum of four subevents in each CIS event in the presence of another communications protocol.
FIG. 9 illustrates an interleaved placement of subevents in a CIG event including two CISes and a maximum of four subevents in each CIS event in the presence of another communications protocol.

In an embodiment, a wireless communications system implements the BLE communications specification and an IEEE 802.11 protocol (e.g., Wi-Fi) or other protocol. All CISes are associated with links of equal quality and the controller places in a CIG a maximum number of subevents for each CIS. FIG. 8 illustrates a sequential placement of subevents in a CIG event including two CISes and a maximum of four subevents in each CIS event in the presence of another communications protocol. The maximum number of subevents of CIS1 (e.g., 4) occurs prior to the maximum number of subevents of CIS2 (e.g., 4), which are followed by events for Wi-Fi (or other protocol). FIG. 9 illustrates an interleaved placement of subevents in a CIG event including two CISes and a maximum of four subevents in each CIS event in the presence of Wi-Fi (or other protocol). The maximum number of subevents of CIS1 are interleaved with the maximum number of subevents of CIS2, e.g., subevents of CIS1 alternate with subevents of CIS2 and events for Wi-Fi (or other protocol) follow the last subevent of CIS2. For example, a first subevent of CIS1 is adjacent to a first subevent of CIS2. Each additional subevent of CIS1 is between a subevent for CIS2 and a next subevent of CIS2. The events for Wi-Fi (or other protocol) occur after the subevents of CIS2.

Figures 10, 11:
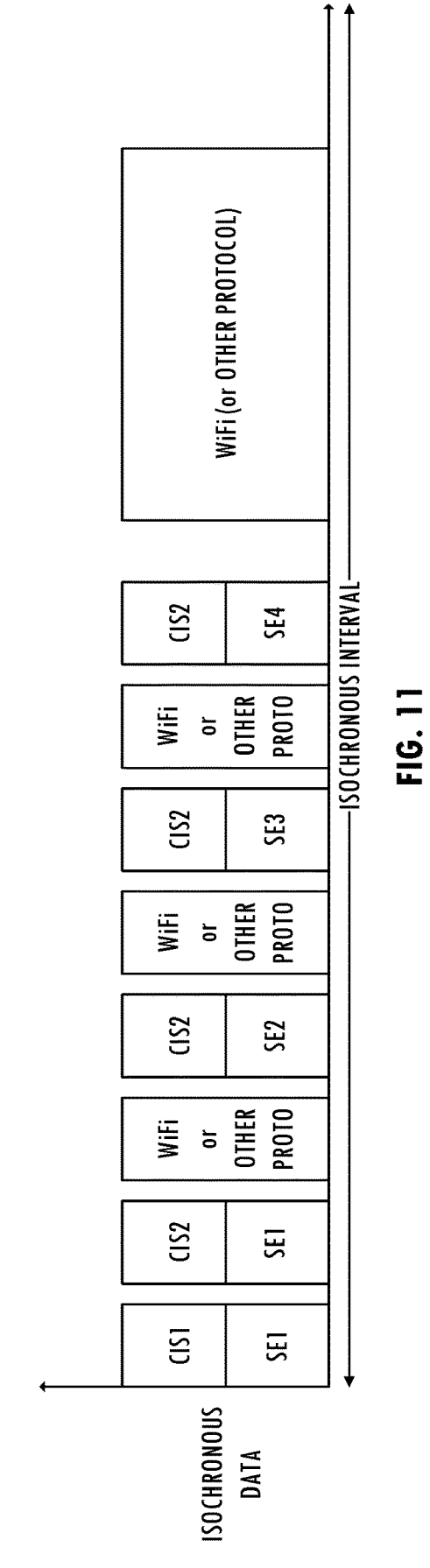
FIG. 10 illustrates a sequential placement of subevents in a CIG event including a CIS having poor link quality.
FIG. 11 illustrates an interleaved placement of subevents in a CIG event including a CIS having poor link quality.

In at least one embodiment of the wireless communications system, the CIS links have different quality levels that cause the links to use different numbers of retransmissions, i.e., different numbers of subevents per CIS event. Referring to FIG. 10, in an exemplary isochronous interval, since CIS1 has a high quality of service, CIS1 receives an acknowledgment in response to a first transmission of a first subevent. Accordingly, the link layer does not transmit any additional subevents for CIS1. However, CIS2 does not receive an acknowledgement in response to at least the first three transmissions of the first three subevents of CIS2. Therefore, the link layer transmits the maximum number of subevents for CIS2. As a result, the isochronous interval includes two subintervals that are not used by the CIG and Wi-Fi (or other protocol) uses those intervals. The resulting isochronous interval includes fragmented CIG subevents and fragmented usage by Wi-Fi (or other protocol).

Referring to FIG. 11, for an exemplary interleaved placement of subevents in a CIG group, the link layer transmits a first subevent of CIS1 adjacent to a first subevent of CIS2. CIS1 receives an acknowledgment in response to the first transmission of the first subevent. However, the link for CIS2 has a lower quality of service than the link for CIS1 and does not receive an acknowledgement in response to at least the first three retransmissions of the first three subevents. Since CIS1 receives an acknowledgment, the link layer does not transmit any additional subevents for CIS1. Subintervals that are not used for retransmissions for CIS1 are used by events of Wi-Fi (or other protocol), which are transmitted adjacent to subevents for CIS2. The resulting isochronous interval includes fragmented CIG subevents and fragmented events for Wi-Fi (or other protocol).

A technique for increasing the reliability and on-air bandwidth utilization by isochronous streams in a wireless communications system using multiple communications protocols includes prioritization of CIS subevents according to CIS link quality. A baseband resource manager or scheduler in a controller of the wireless communications device grants time on the physical channel during an isochronous interval based on prioritization according to CIS link quality. During a first state (e.g., an initialization state), the controller places subevents in a CIG according to conventional sequential or interleaved placement policies, as described above, and counts retransmissions for each CIS link to determine a historical retransmission rate for each of the plurality of CISes. In at least one embodiment, the historical retransmission rate for each of the plurality of CISes is determined using a link quality for the CIS link. For example, a measure of the quality of a link between two BLE controllers can be obtained by issuing using a command that reads the link quality, which is continuously monitored and updated every isochronous interval. In at least one embodiment, link quality is computed as follows:

$$\text{link quality} = 255 \times EmTx/(EmTx + EmReTx),$$
$$EmTx = (\text{gain} \times \text{curr\_Tx} \times 1)/16 + (EmTx \times 15)/16, \text{ and}$$
$$EmReTx = (\text{gain} \times \text{curr\_ReTx} \times 1)/16 + (EmReTx \times 15)/16,$$

where EmTx and EmReTx are exponential moving averages of transmit packets and retransmit packets, respectively, over the monitoring window and curr_Tx and ReTx are the numbers of packets successfully transmitted and Retransmitted, respectively, in the receive window.

After determining the historical retransmission rate for each of the plurality of CISes, the controller updates the placement of CIS subevents in a CIG according to the historical retransmission rates. For example, the controller adjusts one or more timing parameters associated with a CIS of the CIG based on the historical retransmission rate, e.g., using updates to the CIS_offset in the LL_CIS_IND to implement target placements of subevents in the CIG.

Figures 12, 13:
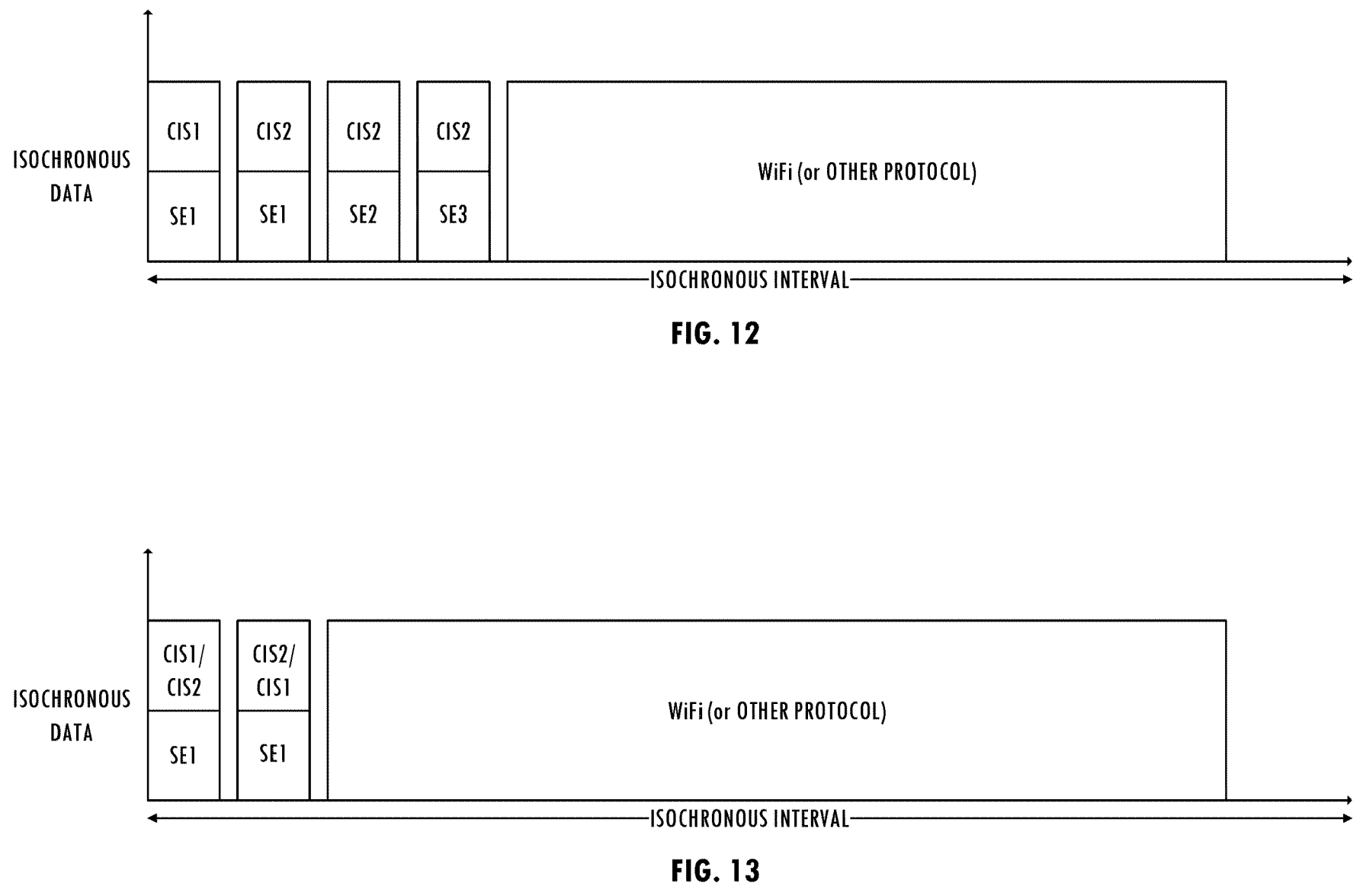

In at least one embodiment, the controller places in the CIG subevents associated with CIS links in an order of lowest historical retransmission rate to highest historical retransmission rate, for example, each CIS has a number of subevents corresponding to the closest integer greater than or equal to one plus the historical retransmission rate, up to the maximum number of subevents per CIS. Referring to FIG. 12, CIS1 has a historical retransmission rate of zero and CIS2 has a historical retransmission rate of 2.6. Accordingly, the controller places one subevent for CIS1 in the CIG and immediately follows it with three subevents for CIS2. The last subevent for CIS2 may be followed by events for Wi-Fi (or other protocol). The events for Wi-Fi (or other protocol) do not interleave with the subevents of the CIG and are uninterrupted by CIS1 and CIS2 subevents in the isochronous interval. FIG. 13 illustrates a best-case scenario for a CIG having two highest-quality CIS links (i.e., historical retransmission rate equals zero) that provides a maximum amount of time for events of Wi-Fi (or other protocol). Each CIS has one subevent in a CIG and the last subevent of the CIG is followed by a contiguous interval that may include events for Wi-Fi (or other protocol). Where the historical retransmission rates of the CISes are equal, the subevent(s) of either CIS are placed first in the CIG. Although FIGS. 12 and 13 illustrate the placement of subevents for two CISes, each having a maximum number of retransmissions of three, this technique can be extended to a CIG having any number of CISes, which can have any maximum number of retransmissions.

Thus, techniques for reducing fragmentation of a transmission by placing CIG subevents in an isochronous interval based on quality of each CIS link have been described. The technique decreases the number of radio switching delays in an isochronous interval, thereby improving performance (e.g., throughput) of BLE communications or communications using the other protocol as compared to a conventional BLE system. For example, a conventional BLE system implements BLE Audio with two CIS links providing 96 kbps of audio using an isochronous interval of 10 ms. If both CIS links need to send a data packet in the isochronous interval, one transmit and one receive use approximately 1200 usec. In this configuration, a maximum number of sub events is three and the second CIS link takes approximately 3.6 ms to start and the total duration used by BLE is approximately 5 ms, leaving approximately 5 ms for another protocol (e.g., Wi-Fi). The BLE to Wi-Fi switching consumes approximately 2 ms, leaving only approximately 3 ms for a Wi-Fi event in a conventional BLE communications system. The techniques described above use only 2.4 ms (2×1200 μs) for the BLE Audio communications leaving Wi-Fi or other protocol approximately 5.5 ms (i.e., 7.5 ms-2 ms) after a radio switching delay, an improvement of approximately 2.5 msec.

The techniques described herein do not require modification to the receiving wireless communications device. The techniques for reducing fragmentation of a transmission may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium.

The description of the invention set forth herein is illustrative and is not intended to limit the scope of the invention as set forth in the following claims. The terms "first," "second," "third," and so forth, as used in the claims, unless otherwise clear by context, distinguish between different items in the claims and do not otherwise indicate or imply any order in time, location or quality. For example, "a first received signal" and "a second received signal" do not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for multi-protocol communications between wireless communications devices using a wireless communications interface, the method comprising:

placing in an isochronous group event, by a first wireless communications device, at least one subevent for each isochronous stream of a plurality of isochronous streams of an isochronous group based on a historical retransmission rate for each isochronous stream of the plurality of isochronous streams, wherein at least one isochronous stream of the plurality of isochronous streams includes fewer than a maximum number of subevents in a corresponding isochronous event of the isochronous group event, wherein the at least one subevent is adjacently placed in the isochronous group event and all isochronous events of the isochronous group event are adjacently placed in an isochronous interval, wherein the isochronous group event is associated with a first wireless communications protocol and all subevents of the isochronous group event are placed contiguously in the isochronous interval before any event of a second wireless communications protocol in the isochronous interval, and wherein communications according to the second wireless communications protocol are present in the isochronous interval and are uninterrupted by subevents of the isochronous group event.

2. The method as recited in claim 1, further comprising:

counting retransmissions for each isochronous stream of the plurality of isochronous streams to thereby determine the historical retransmission rate for each isochronous stream of the plurality of isochronous streams.

3. The method as recited in claim 1, further comprising:

transmitting by the first wireless communications device, packets corresponding to each subevent of the isochronous group, using an isochronous physical channel.

4. The method as recited in claim 1, wherein the at least one subevent is placed in the isochronous group event in an order of ascending or descending historical retransmission rates of corresponding isochronous streams.

5. The method as recited in claim 1 wherein the placing includes adjusting a timing parameter associated with an isochronous stream based on the historical retransmission rate.

6. The method as recited in claim 1 wherein the wireless communications interface is a Bluetooth Low Energy interface, the first wireless communications device is configured as a central device, and a second wireless communications device is configured as a peripheral device, and wherein the isochronous group is a Connected Isochronous Group (CIG).

7. The method as recited in claim 6 wherein the plurality of isochronous streams of the isochronous group are synchronized to a common timing reference of the central device.

8. A wireless communications system comprising:

a first wireless communications device comprising:

a transmitter circuit; and a controller circuit configured to cause the transmitter circuit to transmit, using an isochronous physical channel, at least one subevent for each isochronous stream of a plurality of isochronous streams of an isochronous group based on a historical retransmission rate for each isochronous stream of the plurality of isochronous streams, wherein at least one isochronous stream of the plurality of isochronous streams includes fewer than a maximum number of subevents in a corresponding isochronous event of an isochronous group event, wherein the at least one subevent is adjacently placed in the isochronous group event and all isochronous events of the isochronous group event are adjacently placed in an isochronous interval, wherein the isochronous group event is associated with a first wireless communications protocol and all subevents of the isochronous group event are placed contiguously in the isochronous interval before any event of a second wireless communications protocol in the isochronous interval, and wherein communications according to the second wireless communications protocol are present in the isochronous interval and are uninterrupted by subevents of the isochronous group event.

9. The wireless communications system as recited in claim 8 wherein the controller circuit comprises:

a storage element; and a processor configured to execute instructions stored in the storage element, the instructions being executable by the processor to cause the processor to place in the isochronous group event, the at least one subevent for each isochronous stream of the plurality of isochronous streams of the isochronous group based on the historical retransmission rate for each isochronous stream of the plurality of isochronous streams.

10. The wireless communications system as recited in claim 9 wherein the processor is further configured to count retransmissions for each isochronous stream of the plurality of isochronous streams to thereby determine the historical retransmission rate for each isochronous stream of the plurality of isochronous streams.

11. The wireless communications system as recited in claim 9 wherein the processor is further configured to adjust a timing parameter associated with an isochronous stream based on the historical retransmission rate.

12. The wireless communications system as recited in claim 8 wherein the controller circuit is further configured to place at least one subevent in the isochronous group event in an order of ascending or descending historical retransmission rates of corresponding isochronous streams.

13. The wireless communications system as recited in claim 8 wherein the wireless communications system is a Bluetooth Low Energy system, the first wireless communications device is configured as a central device, and a second wireless communications device is configured as a peripheral device, wherein the isochronous group is a Connected Isochronous Group (CIG), and wherein the plurality of isochronous streams of the isochronous group are synchronized to a common timing reference of the central device.

14. The wireless communications system as recited in claim 8 further comprising:

a second wireless communications device comprising:

a receiver circuit; and a second controller circuit configured to cause the receiver circuit to receive, using the isochronous physical channel, the at least one subevent.

15. A method for communicating between devices using a wireless communications interface, the method comprising:

receiving at least one subevent for each isochronous stream of a plurality of isochronous streams of an isochronous group in an order based on a historical retransmission rate for each isochronous stream of the plurality of isochronous streams, wherein at least one isochronous stream of the plurality of isochronous streams includes fewer than a maximum number of subevents in a corresponding isochronous event of an isochronous group event, wherein the at least one subevent is adjacently placed in the isochronous group event and all isochronous events of the isochronous group event are adjacently placed in an isochronous interval, wherein the isochronous group event is associated with a first wireless communications protocol and all subevents of the isochronous group event are placed contiguously in the isochronous interval before any event of a second wireless communications protocol in the isochronous interval, and wherein communications according to the second wireless communications protocol are present in the isochronous interval and are uninterrupted by subevents of the isochronous group event.

16. The method as recited in claim 15 wherein the order is ascending or descending historical retransmission rates of corresponding isochronous streams.

17. The method as recited in claim 15 wherein the devices are Bluetooth Low Energy devices, a first wireless communications device of the devices is configured as a central device, and a second wireless communications device of the devices is configured as a peripheral device, wherein the isochronous group is a Connected Isochronous Group (CIG), and wherein the plurality of isochronous streams of the isochronous group are synchronized to a common timing reference of the central device.

* * * * *